(No Model.)
J. H. LINVILLE.
GALVANIC BATTERY.
No. 422,534. Patented Mar. 4, 1890.
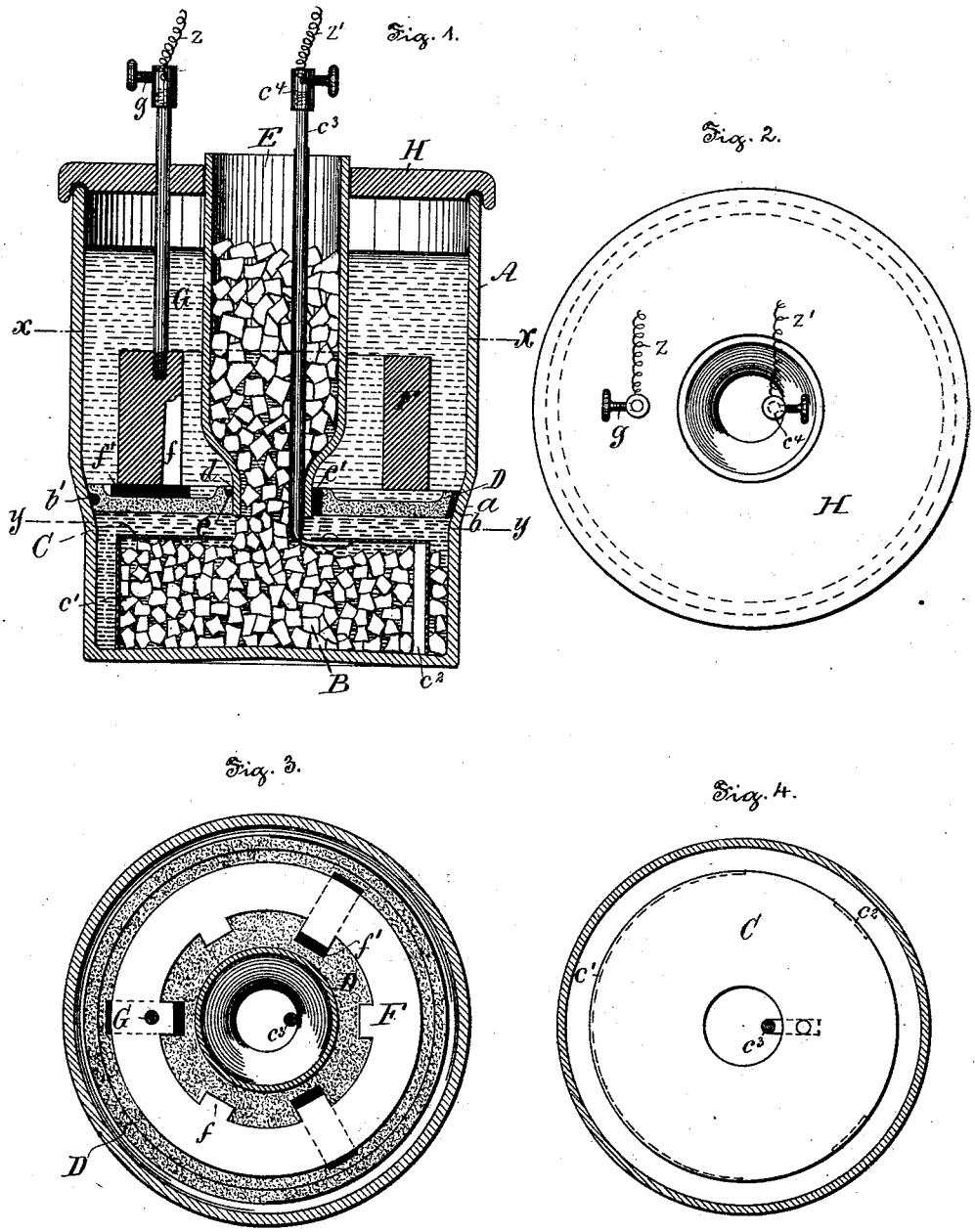

UNITED STATES PATENT OFFICE.

JACOB H. LINVILLE, OF PHILADELPHIA, PENNSYLVANIA.

GALVANIC BATTERY.

SPECIFICATION forming part of Letters Patent No. 422,534, dated March 4, 1890.

Application filed December 11, 1889. Serial No. 333,311. (No model.)

*To all whom it may concern:*

Be it known that I, JACOB H. LINVILLE, a citizen of the United States, residing at Philadelphia, in the county of Philadelphia and State of Pennsylvania, have invented certain new and useful Improvements in Electric Batteries, of which the following is a specification.

My invention relates to electric batteries, and more particularly to the so-called "two-liquid batteries."

Heretofore in two-liquid batteries the liquids have been separated by a porous cup or jar, or when one of the liquids was heavier than the other the heavy liquid formed a stratum at the bottom of the vase or cell and the lighter liquid floated upon it; but these batteries have only been partially efficient, owing to the fact that the separation of the two liquids has never been perfect; for example, they become intermingled by slow diffusion or by agitation incident to the renewal of the battery.

The principal objects of my present invention are, first, to provide a compact and durable two-fluid battery especially adapted for use in connection with electrical apparatus or appliances requiring a constant battery; second, to insure the necessary separation of the two liquids thereof at all times; third, to reduce the internal resistance to a minimum, thereby securing a constant current of maximum intensity, and, fourth, to afford ready access to all parts of the battery for cleansing, renewing, or other purposes.

My invention consists in the new and novel construction and disposition of electric batteries hereinafter more fully described, and pointed out in the claims.

In the accompanying drawings, forming part hereof, Figure 1 is a vertical sectional view of an electric battery embodying the particular features of my invention. Fig. 2 is a top or plan view thereof. Fig. 3 is a transverse section on the line $y$ $y$ of Fig. 1, showing the positive element of the battery; and Fig. 4 is a transverse section on the line $x$ $x$ of Fig. 1, showing the negative element of the battery.

In the drawings, A represents a vase or cell, preferably of glass, provided with a contracted bottom and having an inwardly-tapering projection $a$ formed in the sides or walls thereof.

B represents a mass of crystallized blue vitriol or other preferred metallic salts.

C, Fig. 4, represents the negative element of copper or other preferred material, provided with a depending flange $c'$, or with depending legs or feet $c^2$, as shown in dotted lines in said view. Preference, however, is given to the latter construction, because it entails the consumption of less material in the manufacture of the element.

$c^3$ represents a vertical conductor, either secured to or formed integral with the negative element and provided at the upper extremity thereof with a binding-post $c^4$. This conductor $c^3$ is covered with gutta-percha or analogous material in order to prevent the deposition of copper thereon.

A porous diaphragm D, provided at the center thereof with a circular aperture $d$, rests upon the annular projection $a$ of the vase or cell A, and is sealed thereto either by means of a flat gasket $b$, or by means of a round gasket $b'$, Fig. 1, or in any other preferred manner.

E is a reservoir-tube sealed in the aperture $d$ by means of a flat gasket $e'$, or by means of a round gasket $e$, or in any suitable manner.

F is a positive element of zinc, amalgamated zinc, or other preferred material. Good results in practice have been obtained by, and therefore preference is given to, the making of this element of cylindrical form and to provide it with one or more internal projections $f$, in order to increase the effective area thereof contiguous to the negative element. This element may be supported upon the small blocks $f'$, resting upon the porous diaphragm D, or it may, if preferred, be suspended by rods or screws secured to the cover of the vase or cell, or in any other suitable manner.

G is a vertical conductor, either secured to or formed integral with the positive element F, and provided at its extremity with a binding-screw $g$.

H is an impervious cover or lid, having an annular recess formed around the under side thereof, adapted for the reception of the upper edge of the vase or cell A, and provided with a central circular aperture for the insertion of the reservoir-tube therethrough, and also with a small aperture for the insertion of the conductor G.

$z$ and $z'$ are wires or other conductors secured to the binding-posts $c^4$ and $g$.

The manner of setting up my improved battery for use may be described as follows: The negative element C is placed in the lower portion of the cell or vase A, with its feet $c^2$ resting upon the bottom thereof or upon small blocks, as may be required, and the space between the bottom of the vase or cell and the element is filled with crystals of blue vitriol B. The porous diaphragm D is sealed to place upon the annular projection $a$, and the positive element F is placed in position upon the thin strips of wood $f'$, supported upon the porous diaphragm D. It may be remarked that the extended surfaces of the positive and negative elements are placed in close proximity to the respective sides of the diaphragm D, in order to insure a low internal resistance in the battery. The internal resistance of the battery may be increased or diminished *ad libitum* by increasing or diminishing the distance between the elements by removing the strips of wood $f'$ and replacing them with thicker or thinner ones, as required, or by elevating the negative element in any preferred manner. The reservoir-tube E, surrounding the conductor $c^3$, is sealed to place in the aperture $d$ of the diaphragm D. The chamber located above the porous diaphragm D and containing the positive element is filled with water, preferably acidulated with sulphuric acid. The interior walls of the vase or cell above the surface of the liquid contained therein and the lower surface of the lid or cover are coated with paraffine wax or analogous material in order to obviate climbing of the salts formed during the operation of the battery upon the walls of the cell or vase and bottom of the cover. The cover or lid H is then placed on top of the vase or cell. Water, preferably acidulated with sulphuric acid, is then poured into the reservoir-tube E, previously filled with crystals of blue vitriol, until the chamber located beneath the porous diaphragm is filled and the water rises in the tube E, with, however, care being taken to see that the level of the water contained in the tube E is lower than the level of the acidulated water surrounding said tube. The pressure consequent upon the said difference of level between the water within the tube and that surrounding the same obviates the commingling of the liquids by diffusion or agitation thereof.

The crystals of sulphate of copper descend through the tube E without disturbing the liquids or other parts of the battery and replace the sulphate of copper previously dissolved by the well-understood chemical action which takes place in all batteries of this type. A fresh supply of crystals may be introduced into the tube E whenever found to be exhausted.

Having thus described the nature and objects of my invention, what I claim as new, and desire to secure by Letters Patent, is—

1. The combination, in a two-liquid battery, of a cell, a porous horizontal diaphragm sealed thereto, a vertical impervious tube or reservoir supported by and sealed to said diaphragm, and a positive element above and a negative element below said diaphragm, substantially as and for the purposes described.

2. The combination, in a two-liquid battery, of a vase or cell provided with an internal projection and a horizontal porous diaphragm resting snugly up against said projection, substantially as and for the purposes described.

3. The combination, in a two-liquid battery, of a vase or cell provided with an interior annular projection, a porous diaphragm resting upon said projection, and a gasket interposed between said projection and diaphragm, substantially as and for the purposes set forth.

4. The combination, in a two-liquid battery, of a vase or cell provided with an annular projection, a horizontal diaphragm sealed to said annular projection, and an impervious central tube securely held by said diaphragm, substantially as and for the purposes described.

5. The combination, in a two-liquid battery, of a vase or cell, a lid or cover, a horizontal diaphragm sealed to said vase, and a vertical impervious reservoir or tube sealed to said diaphragm, substantially as and for the purposes described.

6. The combination, in a two-liquid battery, of a vase or cell, a lid or cover, a diaphragm sealed to said vase or cell, and an impervious reservoir or tube passing through said cover or lid and sealed to said diaphragm, substantially as and for the purposes described.

7. The combination, in a two-liquid battery, of a vase or cell, a porous diaphragm sealed thereto, a positive element disposed adjacent to the upper surface of said diaphragm, and a negative element located in proximity to the lower surface of said diaphragm, substantially as and for the purposes described.

8. The combination, in a two-liquid battery, of a vase or cell, a lid or cover, a horizontal diaphragm sealed to said vase, a vertical reservoir or tube passing through said cover and sealed to said diaphragm, and a positive element above and a negative element below said diaphragm, substantially as and for the purposes described.

9. The combination of a two-liquid battery, consisting of a vase provided with an internal projection, a porous diaphragm, and a gasket interposed between said diaphragm and the projection of said vase, a vertical tube supported by and sealed to said diaphragm, and a positive element disposed above and an inverted-cup-shaped negative element disposed below said diaphragm, substantially as and for the purposes described.

In witness whereof I have hereunto set my signature in the presence of two subscribing witnesses.

JACOB H. LINVILLE.

Witnesses:
 THOMAS M. SMITH,
 HERMANN BORMANN.